UNITED STATES PATENT OFFICE.

JOHN BEERHALTER, OF DULUTH, MINNESOTA.

PROCESS OF PREPARING A NON-ALCOHOLIC CHILL-PROOF BEVERAGE.

1,240,016. Specification of Letters Patent. Patented Sept. 11, 1917.

No Drawing. Application filed November 18, 1914. Serial No. 872,872.

*To all whom it may concern:*

Be it known that I, JOHN BEERHALTER, a citizen of the United States, and a resident of Duluth, in the county of St. Louis and State of Minnesota, have invented a new and Improved Process of Preparing a Non-Alcoholic Chill-Proof Beverage, of which the following is a full, clear, and exact description.

My invention relates to non-alcoholic proteic beverages and the method of preparing such beverages. An object of the invention is to prevent normally soluble proteids of the non-alcoholic beverages from becoming insoluble due to a change of temperature or the lapse of time. Another object of the invention is to produce non-alcoholic beverages rich in proteids, which possess great stability and which do not become turbid or cloudy even when chilled for a considerable period of time. A still further object of the invention is to provide a non-alcoholic beverage which will not become turbid and acquire a disagreeable odor when exposed to diffused daylight for a long period of time, and which will be comparatively little affected by the direct rays of the sun. I obtain the above results by employing proteolytic enzyms in the finishing of the product. I am well aware that the use of proteolytic enzyms for alcoholic beverages is not new, but the use of the same for non-alcoholic beverages is new as far as I know.

The term "non-alcoholic beverage" here applies to a product of malted grain, with or without the addition of unmalted grain, sugar and hops, or other flavoring vegetable substances, and charged with carbonic acid gas, which beverage has not been subjected to alcoholic fermentation and cannot be classed with malt extracts used for medicinal purposes, or with beer and ale. Non-alcoholic beverages produced from barley malt or other malted or unmalted grain, sugar and hops, contain considerable proteids, which will render the beverage turbid in time or when chilled. The reason for the clouding of such non-alcoholic beverage is that time, changes of temperature and chilling render a part of its proteids insoluble, thereby causing turbidity, especially noticeable in non-alcoholic beverages, as they lack the preserving power of alcohol, which fermented beers and ales contain.

According to my method of manufacturing a non-alcoholic beverage, the same is prepared by suitable means and there is added to the beverage immediately after cooling, or any time before racking or bottling, a proportion of proteolytic enzyms, active in slightly acid media, sufficient to modify the proteids contained in the beverage, the transformation being in such a manner that the proteids will not precipitate through pasteurizing, storing or chilling. During the pasteurization or storing of the finished product, these added enzyms are active, and those proteids which would normally be rendered insoluble by storage or chilling of the beverage are so modified by the proteolysis that the resulting non-alcoholic beverage will remain clear and brilliant, being no longer sensitive to long time storing or shipping or change of temperature.

The non-alcoholic beverages treated according to my method are unaffected by exposure to diffused daylight for days or even weeks, and comparatively little affected by the direct rays of the sun, whereas such non-alcoholic beverages, not so treated, rapidly acquire a highly disagreeable odor or flavor when exposed to sunlight, and quickly lose their brilliancy, after depositing a sediment of proteids under the action of diffused daylight.

It is practically impossible to specify all proteolytic enzyms which are suited for use in accordance with my invention, or to state a definite proportion in which said enzyms should be added. Enzyms which are suitable for the purpose above described are widely distributed in the vegetable and animal kingdom and are readily prepared in concentrated form by known methods. Their preparations have in several instances become standard articles of commerce. Such preparations are not, however, pure in the sense of consisting solely of enzyms or of a single kind of enzym, and all proteolytic enzyms are in practice recognized only by their effects upon proteid matter. The source from which proteolytic enzyms are derived is not material or important, provided the preparation is free from constituents injurious to the beverage and the enzyms are capable of exerting the proper modifying action upon the proteids under the conditions existing in beverages during or after the pasteurization at a temperature of 55 to 60° C. The enzyms selected should be such as are capable of inducing proteolysis in slightly acid liquids, and such as are not destroyed or rendered permanently inactive by subjection to the usual temperature of pasteurization. The activity of enzyms from various sources differs greatly, their activity being also affected by their mode of preparation or concentration; and inasmuch as the proportion or quantity to be used is dependent upon their activity, it is evident that such proportion or quantity can be specified only in particular cases, being, however, readily determined by a simple test for each case.

Enzyms which are suited for use in accordance with my invention may be prepared from malt and by other known methods described in well-known journals of the United States of America, France, Denmark and Germany. (See *Allen Commercial Analysis*, 4th edition, Vol. VIII, pages 491–492).

Besides the peptase prepared from malt, preparations containing proteolytic enzyms from other sources are well adapted for use, provided they are active in slightly acid media, and are free from substances injurious to the beverage. Such enzyms are, for example, papain, derived from papaw, and pepsin, derived from the gastric secretion of mammals, and such commercial preparations as, for instance, papain and pepsin, often exhibit a high degree of activity, which makes them suitable for the purpose of my invention. The above mentioned enzyms and their kind can, however, not be obtained pure by known methods, and it is not possible to ascribe to them definite chemical properties; in fact, their value is determined by their digestive power only.

It is also important to notice that zymogens subject to conversion into proteolytic enzymes can be used for my method of manufacturing non-alcoholic beverages.

The proportion of coagulable albuminoids in the beverage determines the amount of enzyms necessary for my purpose, subject to the activity possessed by the enzyms. Care must be taken not to add an excess of enzyms, as it would render the beverage sensitive to turbidity.

Having thus described my invention, I claim as new and desire to secure by Letters Patent:

1. In the manufacture of non-alcoholic beverages containing proteids, a step consisting in adding to the beverage, subsequent to the cooling of the wort, an ingredient preventing the coagulation of proteids under a change of temperature or the lapse of time.

2. In the manufacture of non-alcoholic beverages produced from malted grain, and charged with carbonic acid gas, a step which consists in adding to the beverage subsequent to the cooling of the wort a proteolytic enzym active in slightly acid media.

3. In the manufacture of non-alcoholic beverages, produced from malted grain and flavoring vegetable substances, and charged with carbonic acid gas, the step which consists in adding to the beverage subsequent to the cooling of the wort, a proteolytic enzym active in slightly acid media, such enzym being added in proportions and under conditions to remain in the finished beverage in the described state of activity and to render the beverage chill-proof and more stable at ordinary temperatures.

4. In the manufacture of non-alcoholic beverages, produced from malted grain and other flavoring vegetable substances, and charged with carbonic acid gas, the step which consists in adding to the beverage, subsequent to the cooling of the wort, a proteolytic enzym active in slightly acid media, such enzym being added in proportion and under conditions to remain in the finished beverage in the described state of activity and to render the beverage chill-proof and more stable at ordinary temperatures, and subsequently pasteurizing.

5. In the manufacture of non-alcoholic beverages, produced from malted grain, and other flavoring vegetable substances, and charged with carbonic acid gas, the step which consists in adding to the beverage subsequent to the cooling of the wort, a preparation derived from malt, said preparation containing a proteolytic enzym active in slightly acid media, and being practically free from unstable albumens which are devoid of proteolytic action, said enzym being added in proportions and under conditions to remain in the finished beverage in the described state of activity, and to render the beverage chill-proof and more stable at ordinary temperatures.

In testimony whereof I have signed my name to this specification in the presence of two subscribing witnesses.

JOHN BEERHALTER.

Witnesses:
Philip C. Schmidt,
L. M. Hanson.